United States Patent [19]

Takagi

[11] 4,390,143

[45] Jun. 28, 1983

[54] MANUALLY OPERABLE ATTACHMENT FOR THE LOCKING MECHANISM OF SAFETY BELT RETRACTOR

[75] Inventor: Masayuki Takagi, Fujisawa, Japan

[73] Assignee: NSK-Warner K.K., Tokyo, Japan

[21] Appl. No.: 252,072

[22] Filed: Apr. 8, 1981

[30] Foreign Application Priority Data

Apr. 16, 1980 [JP] Japan .......................... 55-051209[U]

[51] Int. Cl.³ ...................... A62B 35/02; B65H 75/48
[52] U.S. Cl. ...................... 242/107.4 A; 242/107.4 R
[58] Field of Search ................. 242/107.4 A, 107.4 R, 242/107.4 B, 107.6, 107.7; 280/806; 297/478, 480

[56] References Cited

U.S. PATENT DOCUMENTS

| | | | |
|---|---|---|---|
| 4,090,735 | 5/1978 | Czernakowski | 242/107.4 A X |
| 4,181,326 | 1/1980 | Hollowell et al. | 242/107.4 A X |
| 4,280,584 | 7/1981 | Makishima | 242/107.4 A X |

*Primary Examiner*—John M. Jillions
*Attorney, Agent, or Firm*—Cantor and Lessler

[57] ABSTRACT

A manually operable attachment for a locking mechanism adapted for use in a safety belt retractor for vehicle comprises a pivotable member and a rod secured to one end thereof. In use, the pivotable member is manually actuated by means such as a wire pulling means or an electromagnet. An arm is also added to a sensor for the detection of a change in the velocity of a vehicle. The rod is forced down in association with the pivotal movement of the pivotable member, so that its end gives a push to the arm which, in turn, actuates an intermediate means of the retractor locking mechanism.

7 Claims, 9 Drawing Figures

MANUALLY OPERABLE ATTACHMENT FOR THE LOCKING MECHANISM OF SAFETY BELT RETRACTOR

BACKGROUND OF THE INVENTION

The present invention relates to a manually operable attachment for the non-locking or emergency locking retractor adapted for a use in a safety belt for vehicle.

In safety belt systems for vehicles, various locking mechanisms have been proposed with a view to preventing further withdrawal of the belt when there is a quick change in the velocity of a vehicle due to vibration, rolling, collision and so on.

It is sometimes required to hold baggage on a front passenger seat or an infant or children on an auxiliary carrier placed thereon with the use of the safety belt. In the non-locking retractors, or emergency locking retractors, however, there is a possibility that the restraint effect of the belt on the occupant is unsatisfactory. For instance, the baggage of infant may slip out of the seat when the vehicle rolls, or is involved in an accident such as a car crash.

SUMMARY OF THE INVENTION

A main object of the present invention is to provide a manually operable attachment for a locking mechanism adapted for use in a safety belt retractor of the non-locking or emergency locking type for a vehicle, which is actuated by operation of suitable means located in position convenient if required to the driver's seat, for example, by withdrawal of a wire or excitation of an electromagnet, thus ensuring easy operation of the retractor locking mechanism.

BRIEF DESCRIPTION OF THE ACCOMPANYING DRAWINGS

Other objects and advantages of the present invention will be stated in the following description of the drawings, wherein.

DETAILED DESCRIPTION OF PREFERRED EMBODIMENTS

Figure 1:
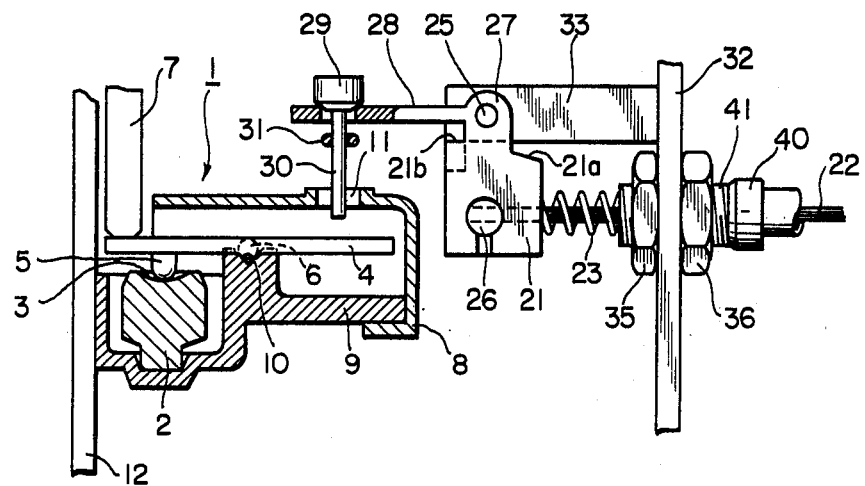
FIG. 1 is a view illustrative of one embodiment of the present invention.
Figure 2:
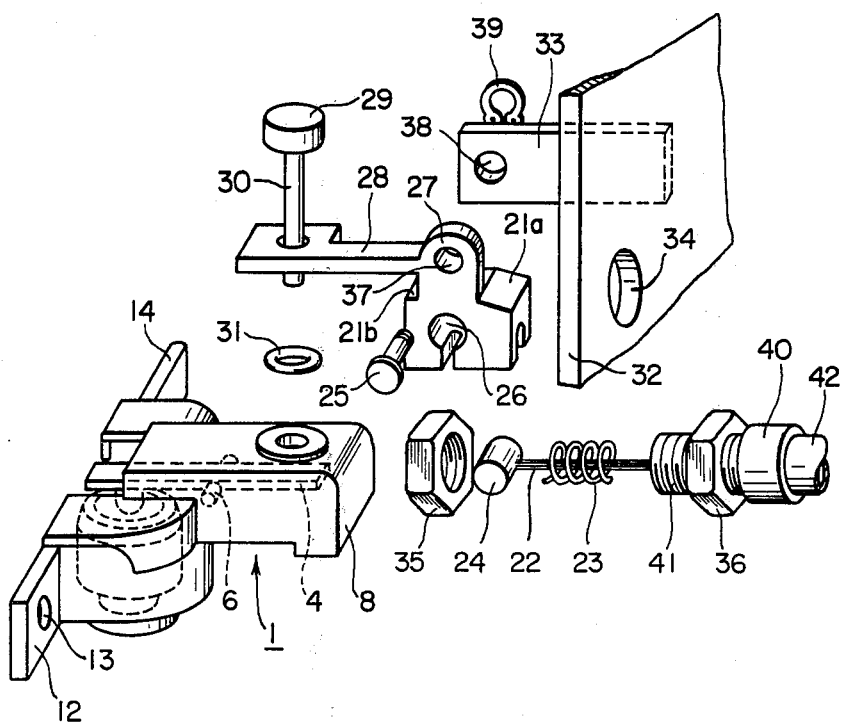
FIG. 2 is an exploded view of the parts used in the embodiment of FIG. 1.
Figure 3:
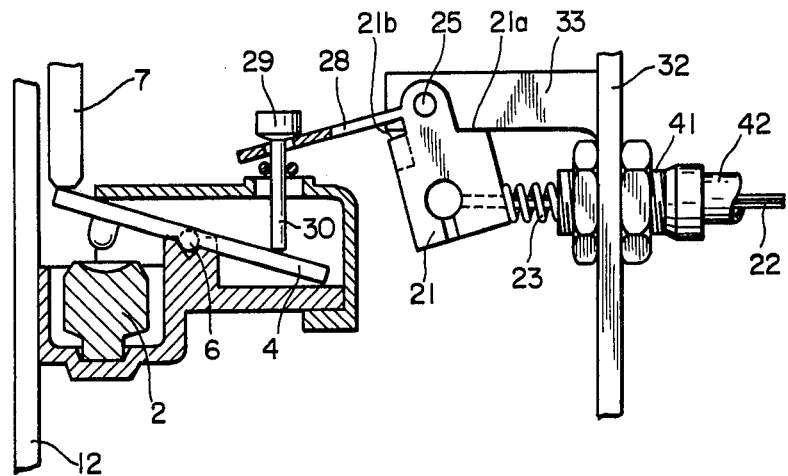
FIG. 3 is a view illustrative of the embodiment of FIG. 1 which is in operation.

Referring to FIG. 1, there is shown a first embodiment of the manually operable attachment applicable to the emergency locking retractor, which is designed to be actuated by a pulling operation of a wire or the like. This embodiment is illustrated such that it is in its inoperative condition. FIG. 2 is an exploded view of the parts, and FIG. 3 is a view of the attachment which is put in operation by pulling the cable.

A frame shown generally at 1 is provided, including therein an inertia sensor 2 for the detection of change in the velocity of the vehicle. An arm 5 has a projection 4 to come into contact with a recessed top face 3 of the sensor 2, and is pivotally supported on a V-shaped section 10 of a bottom plate 9 of the frame 1 through pin 6 serving as a pivot. A locking mechanism (not shown) is designed to be operable by pivotal movement of the arm 4 through an intermediate means 7 coming into contact with one end of the pivot arm 4. There are also provided a cover 8 for the frame 1, a plate 12 for fixing the frame to one side of the vehicle, a mounting hole 13 and a plate 14 for fixing the frame to the other side of the vehicle.

In the arrangement thus constructed, when the inertia sensor rocks in response to a quick change in the velocity of the vehicle, the projection 5 is elevated along the inclined portion of the recessed top face 3 thereof. The pivot arm 4 then swings in the clockwise direction around the pivot pin 6 positioned on the V-shaped section 10, so that the intermediate means 7 is forced up until the retractor locking mechanism is actuated, whereby further withdrawal of the belt is stopped or restrained. According to this embodiment, there is provided a manually operable attachment for the emergency locking retractor. A tiltable block shown generally at 21 has therein a hole 26, in which is fixedly inserted a pin-supporting piece 24 attached to the end of a cable 22. The tiltable block 21 is provided on the upper part with a lug 27 having a width smaller than that of the block, said lug being formed with a piece 28 extending at right angles therewith. The extending piece 28 includes a rod 30 passing snugly through its end, said rod being provided on the upper part with a weight 29. A part of the extension 28 located in the vicinity of the lug 27 is similar in width to the lug, but the end part thereof has a width large enough to permit provision of a hole through which the rod 30 passes snugly. An O-ring 31 is inserted over the rod 30.

An adapter plate 33 is fixed perpendicularly to a retaining plate 32, and a pin 25 is fixed in place by a snap ring 39, extending through the holes 37 and 38 of the tiltable block 21 and the adapter plate 33. In this way, the tiltable block 21 is pivotally supported on a lower portion of the adapter plate 33 through the pin 25. Shoulders 21a and 21b of the block 21 are spaced away from the lower portion of the tiltable block 21. A cable duct 40 is inserted into a through-hole 34, and clamped on both sides by means of nuts 35 and 36 threaded onto a screw 41. The cable 22 is then inserted through the duct 40. It should be noted that a spring 23, through which the cable passes, is interposed between the block 21 and the cable duct 40, and that a cable protecting sleeve 42 extends from the duct 40, through which the cable also passes.

As will be best seen from FIG. 3, if the operator on the seat pulls the cable 22, whenever occasion requires, the tiltable block 21 swings counterclockwise against the spring 23 together with the extension 28, so that the free end thereof descends toward the frame 1. Consequently, the rod 30, which is now positioned above the right-hand end of the pivot arm 4 through a hole 11 in the cover 8, descends together with the weight 29, and gives a push to the right-hand end of the arm 4 in cooperative with the weight 29. Since the pivot arm 4 then swings clockwise as illustrated the intermediate means 7 is forced up independently of the inertia sensor 2 until actuation of the retractor locking mechanism occurs. In this connection, it should be understood that the shoulders 21a and 21b of the tiltable block 21 about against the adapter plate 33, and serve together as a stopper for further tilting movement of the block.

Figure 4:
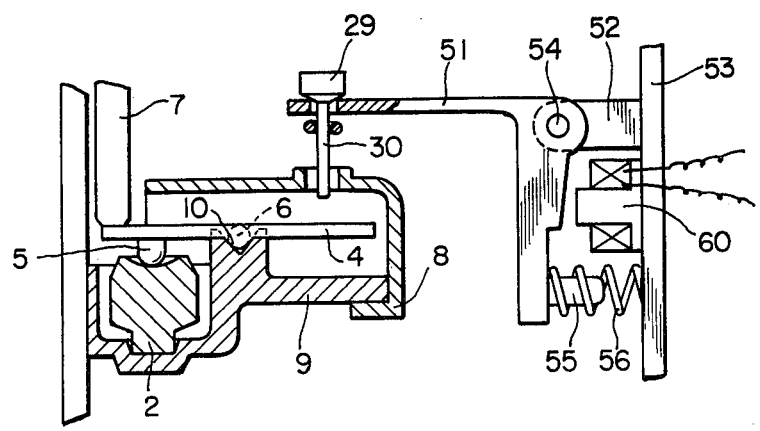
FIG. 4 is a view illustrative of another embodiment of the present invention.
Figure 5:
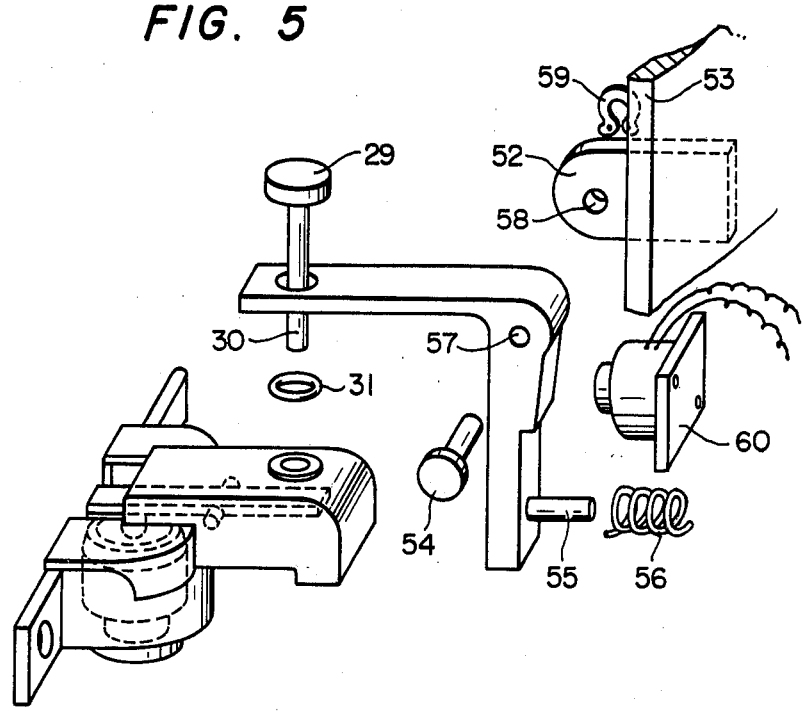
FIG. 5 is an exploded view of the parts used in the embodiment of FIG. 4.
Figure 6:
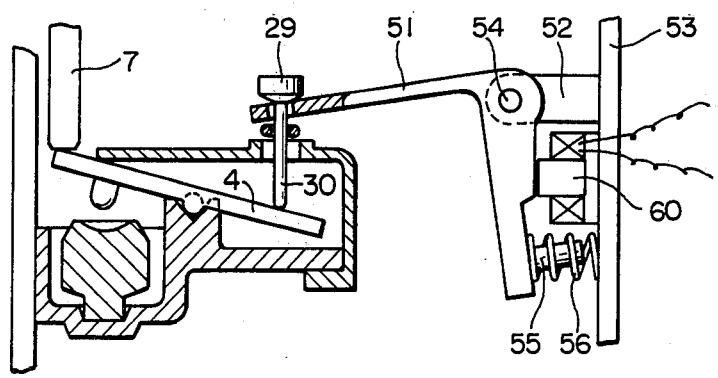
FIG. 6 is a view illustrative of the embodiment of FIG. 4 which is in operation.

FIG. 4 illustrates a second embodiment of the present invention applicable to the emergency locking retractor, in which the cable is replaced by an electromagnet. FIG. 5 is an exploded view of the parts used in the embodiment, and FIG. 6 is a view of the embodiment wherein the electromagnet is excited or energized. Throughout FIGS. 1 to 6, like numerals indicate like parts.

In this embodiment, an angle member 51 is pivotally supported on an adapter plate 52 by a pin 54. The angle member 51 is provided at one end with a downwardly extending rod 30 having a weight 29, said rod being positioned above the right-hand end of an arm 4. The angle member is also formed at the other end with a lug 55 surrounded with a coil spring 56 which is disposed between the angle member 51 and a retaining plate 53 for fixing the adapter plate 52 in place. As best illustrated in FIG. 5, the pin 54 extends through a hole 57 in the corner section of the member 51 and a hole 58 in the adapter plate 52, and is fixed in place by a snap ring 59. An electromagnet 60 is secured on the retaining plate 53. When it is intended to actuate the attachment thus constructed, the electromagnet 60 is energized as by pushing a button on the seat. As shown in FIG. 6, the angle member 51 is drawn and pivoted against the spring 56 in the counterclockwise direction, thus permitting the rod 30 to descend. Descending movement of the rod 30 causes clockwise pivotal movement of the arm 4 and ascending movement of an intermediate means 7 with the result that, like the first embodiment, the retractor locking mechanism is actuated independently of the emergency locking mechanism responding to an inertia sensor.

While the present invention has been described with reference to the embodiments wherein the manual locking mechanism is attached to the emergency locking retractor, this manual locking mechanism is also applicable to the non-locking retractor.

Figure 7:
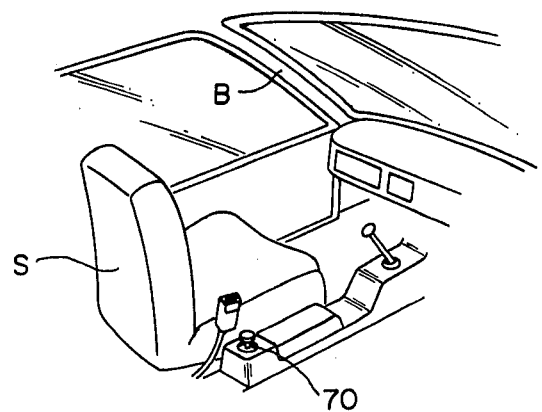
FIG. 7 is a view showing one embodiment of the manually operable means according to the present invention.

Referring to FIG. 7, there is shown one embodiment of the manually operable means according to the present invention, in which B is a part of the framework of a vehicle, and S is a front passenger seat. For example, the manually operable means may be of any form including a wire pulling means or an electromagnet button, and is distinguishably colored and provided in a place or position to which the driver on the seat is easily accessible.

Figures 8, 9:
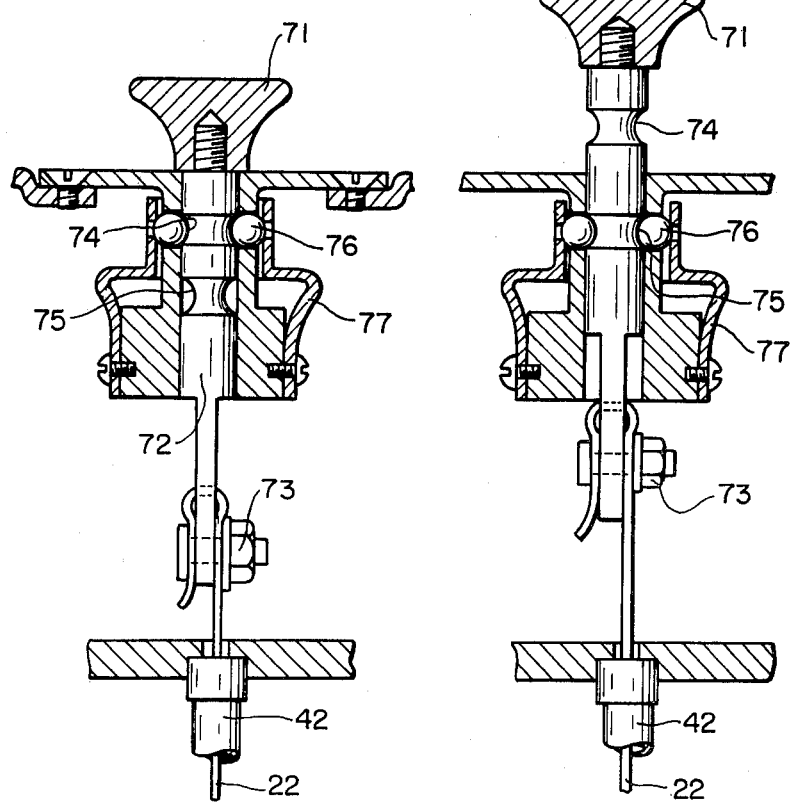
FIGS. 8 and 9 are views showing one embodiment of the wire pulling means which is in its operative and inoperative condition, respectively.

Referring to FIGS. 8 and 9 which are views showing one embodiment of a cable pulling means 70 in its operative and inoperative condition, respectively, a knob 71 is fixedly provided with a rod 72 having at the free end a cable connector or coupler 73, from which extends a cable 22 covered with a protective sleeve 42, as mentioned in the foregoing. The rod 72 is formed in the upper and lower portions with notches 74 and 75, the former notch being designed to receive balls 76 which are locked in place by a resilient adapter plate 77. In FIG. 8, the knob 71 is shown to be forced down and put in its inoperative condition, corresponding to FIG. 1. The balls 76 are fitted in the upper notch 74 to lock the means 70 in place. The tiltable block 21 is restored by the spring 23, and the shoulder 21b thereof serves as a stopper.

To actuate the means 70, the knob 71 is pulled up as shown in FIG. 9, so that the cable 22 is withdrawn to a state as depicted in FIG. 3, to thereby actuate the retractor locking mechanism. The balls 76 are then fitted in the lower notch 75 to lock the means 70 in place.

By making use of the relatively simple attachment to which reference has been made, the present invention renders it possible to actuate easily and surely the retractor locking mechanism for the safety belt in a manual manner, whenever occasion requires. In addition, the means used for giving a push to the pivot arm 4 comprises the weighted rod having a certain degree of freedom, which is effective in preventing the attachment from being subjected to overloads.

It will be seen from the foregoing description of the structure and operation of the preferred embodiment of the present invention that the above-mentioned object are accomplished by the instant attachment. Of course, modifications, alternations and variations of the attachment may be made by persons those skilled in the art which come within the purview of the present invention.

What is claimed is:

1. In a locking mechanism for use in a safety belt retractor which includes retractor means normally biased in the webbing-retracting direction while allowing webbing withdrawal, locking means adapted to be placed in an engaging position for preventing webbing withdrawal, sensor means for sensing a change in the speed of the vehicle, and transmitting means for actuating said locking means responsive to said sensor means; the improvement comprising manually operated means for actuating said locking means, said manually operated actuating means comprising a vertically disposed weighted actuating member arranged to actuate said transmitting means independently of said sensor means, a tiltable member holding said actuating member in a normally raised position out of contact with said transmitting means, and means for moving said tiltable member downwardly, thereby allowing said actuating member to contact and actuate said transmitting member, said actuating member being vertically moveable with respect to said tiltable member.

2. A locking mechanism according to claim 1, in which said actuating member comprises a suspended rod.

3. A locking mechanism according to claim 2, in which said means for moving said tiltable member is a cable pulling means.

4. A locking mechanism according to claim 3, which further includes a knob for pulling said cable, said knob being colored for apparent discrimination.

5. A locking mechanism according to claim 2, in which said means for moving said tiltable member is an electromagnet.

6. A locking mechanism according to claim 5, which further includes a switch for activating said electromagnet, said switch being colored for apparent discrimination.

7. A locking mechanism according to claim 1, 2, 3, 4, 5 or 6, wherein said transmitting means comprises a pivotable arm having its fulcrum intermediate the ends thereof and means at one end thereof for causing upward movement of said one end responsive to said sensor, said locking means being operatively connected to said one end, and said actuating member is disposed over the other end of said arm.

* * * * *